US006875809B2

(12) United States Patent
Rozynov et al.

(10) Patent No.: US 6,875,809 B2
(45) **Date of Patent: *Apr. 5, 2005**

(54) CONTROL OF VOLATILE CARBONYL COMPOUND IN COMPOSITIONS USED IN PRINTING, PRINTING METHODS AND RESULTING PRINTED STRUCTURE

(75) Inventors: Boris Vasilyevich Rozynov, Columbia Heights, MN (US); William J. Coyle, Appleton, WI (US); Willard E. Wood, Arden Hills, MN (US); Neil J. Beaverson, Hugo, MN (US)

(73) Assignees: Cellresin Technologies, LLC, Minneapolis, MN (US); Graphic Packaging International, Inc., Menasha, WI (US)

( * ) Notice: Subject to any disclaimer, the term of this patent is extended or adjusted under 35 U.S.C. 154(b) by 572 days.

This patent is subject to a terminal disclaimer.

(21) Appl. No.: 09/866,355

(22) Filed: May 25, 2001

(65) Prior Publication Data

US 2001/0036538 A1 Nov. 1, 2001

Related U.S. Application Data

(62) Division of application No. 09/525,792, filed on Mar. 15, 2000.

(51) Int. Cl.[7] .................................................. C08L 41/00

(52) U.S. Cl. ........................ 524/547; 524/555; 524/556; 524/557; 524/560; 524/577

(58) Field of Search ................................ 524/547, 555, 524/556, 557, 560, 577

(56) References Cited

U.S. PATENT DOCUMENTS

| | | | | |
|---|---|---|---|---|
| 4,116,896 | A | | 9/1978 | Garrett et al. |
| 4,230,525 | A | | 10/1980 | Yamaguchi et al. |
| 4,240,938 | A | | 12/1980 | Kraft et al. |
| 4,264,760 | A | | 4/1981 | Meyer |
| 4,331,704 | A | | 5/1982 | Watson, Jr. et al. |
| 4,374,814 | A | | 2/1983 | Gaylord |
| 4,414,309 | A | | 11/1983 | Langen et al. |
| 4,437,960 | A | | 3/1984 | Zengel et al. |
| 4,442,552 | A | | 4/1984 | Bolick et al. |
| 4,480,139 | A | | 10/1984 | Scott et al. |
| 4,523,038 | A | | 6/1985 | Scott et al. |
| 4,594,383 | A | | 6/1986 | Fogg et al. |
| 4,686,790 | A | | 8/1987 | Lahalih et al. |
| 4,778,529 | A | | 10/1988 | Barker et al. |
| 4,786,287 | A | | 11/1988 | Nashef et al. |
| 4,892,719 | A | | 1/1990 | Gesser |
| 4,935,463 | A | | 6/1990 | Stockel et al. |
| 4,954,372 | A | | 9/1990 | Sako et al. |
| 4,969,480 | A | | 11/1990 | Hughes |
| 5,054,394 | A | | 10/1991 | Zweig |
| 5,153,061 | A | | 10/1992 | Cavagna et al. |
| 5,163,999 | A | | 11/1992 | Uchida et al. |
| 5,164,000 | A | | 11/1992 | Gamblin |
| RE34,329 | E | | 8/1993 | Baker et al. |
| 5,279,648 | A | | 1/1994 | Chase |
| 5,279,927 | A | | 1/1994 | Walls et al. |
| 5,284,892 | A | | 2/1994 | Brodie, III et al. |
| 5,317,071 | A | | 5/1994 | Honeycutt |
| RE34,647 | E | | 6/1994 | Baker et al. |
| 5,352,368 | A | | 10/1994 | Honeycutt |
| 5,362,784 | A | | 11/1994 | Brodie, III et al. |
| 5,378,762 | A | | 1/1995 | Czornij et al. |
| 5,380,623 | A | | 1/1995 | Miller et al. |
| 5,413,827 | A | | 5/1995 | Brodie, III et al. |
| 5,420,229 | A | | 5/1995 | Burke et al. |
| 5,424,204 | A | | 6/1995 | Aoyama et al. |
| 5,492,741 | A | | 2/1996 | Akao et al. |
| 5,492,952 | A | | 2/1996 | Tonogaki et al. |
| 5,543,270 | A | | 8/1996 | Akao et al. |
| 5,545,336 | A | | 8/1996 | Wheeler et al. |
| 5,567,747 | A | | 10/1996 | Cappuccio et al. |
| 5,618,649 | A | | 4/1997 | Vermeersch et al. |
| 5,637,444 | A | | 6/1997 | Matsumoto |
| 5,645,756 | A | | 7/1997 | Dubin et al. |
| 5,677,101 | A | | 10/1997 | Noguchi et al. |
| 5,720,800 | A | | 2/1998 | Matsumoto |
| 5,723,239 | A | | 3/1998 | Itakura et al. |
| 5,723,253 | A | | 3/1998 | Higashino et al. |
| 5,725,961 | A | | 3/1998 | Ozawa et al. |
| 5,731,127 | A | | 3/1998 | Ishizuka et al. |
| 5,762,696 | A | | 6/1998 | Jordan |
| 5,763,530 | A | | 6/1998 | Chen et al. |
| 6,541,560 | B1 | * | 4/2003 | Rozynov et al. ............ 524/547 |

FOREIGN PATENT DOCUMENTS

| | | | |
|---|---|---|---|
| EP | 0 526 977 | A2 | 2/1993 |
| WO | WO 00/01527 | | 1/2000 |

OTHER PUBLICATIONS

Chemical Abstract of Sodium Bisulfate, © 1996 by Merck & Co., Inc.

Lazzari, M. et al., "Drying and Oxidative Degradation of Linseed Oil", *Polymer Degradation and Stability*, vol. 65, pp. 303–313 (1999).

Robertson, G., "Chapter 5: Processing and Converting of Thermoplastic Polymers", *Food Packaging Principles and Practice*, pp. 138–143 (1993).

(Continued)

*Primary Examiner*—Edward J. Cain
(74) *Attorney, Agent, or Firm*—Merchant & Gould P.C.

(57) ABSTRACT

Volatile organic compounds containing carbonyl groups can be released by lithographic printing materials including inks, fountain solutions and printed materials. Volatile organic compounds containing carbonyl groups can also have a serious negative impact on the taste or odor of staple materials such as foodstuffs. The volatile materials can be retained in the lithographic compositions and printed materials can be trapped in the printed materials using an improved reactive technology involving a chemically reactive trap for such volatile carbonyl containing compounds.

23 Claims, 3 Drawing Sheets

OTHER PUBLICATIONS

Strauss, V., "Chapter 1: Printing Processes and Methods, Section 4: Planographic Printing", *The Printing Industry*, pp. 35–40 (1967).

Strauss, V., "Chapter VI: Printing Process, Section 2: Printing Units, and Section 3: The Inking Units", *The Printing Industry*, pp. 309–350 (1967).

Strauss, V., "Chapter IX: Printing Inks, Section 3: Vehicles for Printing Inks", *The Printing Industry*, pp. 593–616 (1967).

"The Printing Process", *Source unknown*, pp. 1–89 (Date unknown).

* cited by examiner

CONTROL OF VOLATILE CARBONYL COMPOUND IN COMPOSITIONS USED IN PRINTING, PRINTING METHODS AND RESULTING PRINTED STRUCTURE

"This application is a divisional of application Ser. No. 09/525,792, filed Mar. 15, 2000, which application(s) are incorporated herein by reference."

FIELD OF THE INVENTION

The invention relates to compositions used in lithographic printing, processes. Further the invention relates to a fountain solution, an overcoat composition, a printing manufacturing process and printing packaging material. The composition of the invention uses a reactive chemistry to reduce volatile organic carbonyl compound release. The printed material resulting from the use of the compositions of the invention can contain a constituent, additive or layer that can react with, reduce the release of or trap any volatile organic compound with a reactive carbonyl. Such volatile compounds include but are not limited to aldehyde, ketone, carboxylic acid or other such volatile organic compounds. These compounds, if not dealt with, can be released proximate a printing installation. The volatile carbonyl compound can alter the oganoleptic character, the mouthfeel, taste or odor, of comestible materials such as any food, beverage, medicine or other composition fit for human contact sealed within the printed container.

BACKGROUND OF THE INVENTION

Contamination of materials intended for human contact, consumption or ingestion, including medicine, foodstuffs or beverages, by relatively volatile materials arising from packaging materials has been a common problem for many years. The introduction of off odors and off flavors into foods and beverages has become an increasing problem with the introduction of printed packaging. The contamination can arise from coatings, volatile ink components, fountain solution formulations, recycled materials, additives and other sources in the packaging. These undesirable contaminants produce an organoleptic stimuli, particularly to those consumers quite sensitive to the presence of unexpected or undesirable odors and flavors, that can result in waste and negative reactions from the consumer. The problem has been particularly worsened because of the increasing need for colorful, eye-catching, market oriented printing on consumer packaging in snack food, breakfast cereal, TV dinner, carbonated beverage and other strongly consumer oriented products.

The contamination problem can arise in printed materials with colorful legends on virgin or recycled cardboard, paper or label stock using typical lithographic technology. Printed materials are complex structures having multiple layers and a variety of materials that can be added to or coated onto individual layers. The combination can arise from chemicals used in manufacturing the individual layers. coating materials onto the layers, from printing inks used in manufacturing the printed materials, fountain solutions, additives, coatings and any other component in the manufacturing process. Such contamination typically arises from volatile organic compounds that arise from the printed structure and released into the atmosphere internal or external to the packaging material.

Such volatile materials that seem particularly objectionable include compounds with a reactive carbonyl group:

wherein R is independently aromatic, aliphatic, alkyl or other group and X is R or H or OH. Representative materials include aldehyde, ketone, carboxylic acids or other volatile $C_{1-24}$ organic compounds containing a carbonyl group. Many of these compounds have a strong off odor or off flavor that can contaminate the odor or flavor of foods or beverages. Such materials can have a detection threshold of as little as one part of volatile compound per billion parts of either food or atmosphere. Further, proximate to printing installations, the airborne concentration of these volatile organic materials can create an undesirable or harmful environment for printing workers.

Numerous attempts have been made to improve methods for removing or trapping carbonyl compounds. Gaylord, U.S. Pat. No. 4,374,814; Bolick et al. U.S. Pat. No. 4,442,552; Scott et al., U.S. Pat. No. 4,480,139; and Scott et al., U.S. Pat. No. 4,523,038, all discuss the use of organic compounds having pendant hydroxyl groups as aldehyde scavengers. An aldehyde is one species of carbonyl compound having the structure R—CHO; wherein the R group is typically aromatic or aliphatic group and the CHO represents a carbonyl with a bonded hydrogen. Other volatile compounds can have a aldehyde group a ketone or carboxylic group. These patents all appear to teach these polyhydric water soluble organic compounds that can, through an aldol condensation, react with an aldehyde to trap gaseous aldehyde.

A different scavenging technique, using polyalkylene amine materials to scavenge unwanted aldehydes from polyolefin polymeric materials, is taught by Brodie, III et al., U.S. Pat. Nos. 5,284,892; 5,362,784 and 5,413,827; and Honeycutt, U.S. Pat. Nos. 5,317,071 and 5,352,368. In unrelated technology, Gesser, U.S. Pat. No. 4,892,719, utilizes a coating of a polymeric hydrazine or polymeric amine (polyethylenimine, polyallylamine, polyvinylamine) with a plasticizer on a fiberglass or paper air filter to trap sulfur oxides, $H_2S$, $CH_2O$ and other acidic gases. Langen et al., U.S. Pat. No. 4,414,309, use heterocyclic amine compounds as aldehyde scavengers in photoemulsions used in photographic materials. Nashef et al., U.S. Pat. No. 4,786,287 and Trescony et al., U.S. Pat. No. 5,919,472, utilize an amine compound in implantable bioprosthetic tissues to reduce residual aldehyde concentrations.

In a non-analogous technology. Cavagna et al., U.S. Pat. No. 5,153,061, claims the use of absorbing coatings such as activated carbon to reduce the migration of chlorinated dioxins or chlorinated furans from paperboard materials. Meyer, U.S. Pat. No. 4,264,760, uses a sulfur compound at a valence of +5 to −2 inclusive in the form of a sulfuroxyacid as a aldehyde scavenger to reduce aldehyde odor. Aoyama et al., U.S. Pat. No. 5,424,204, claim stabilization of glucose 6-phosphate dehydrogenase with hydroxylamine aldehyde scavengers and other compounds. Wheeler et al., U.S. Pat. No. 5,545,336, teach methods of neutralizing aldehyde in waste waters through an aldehyde sodium pyrosulfite reaction. Flexographic printing inks and related fountain solutions are taught in Cappuccio et al., U.S. Pat. No. 5,567,747, and Chase. U.S. Pat. No. 5,279,648, respectively. Lastly, Osamu, JP 10-245794, teaches a wet strength agent for cellulosic webs constituting a free formaldehyde scavenger (comprising urea, melamine, sulfite, ammonium or guanidine salt) combined with a wet strength agent such as urea formaldehyde or melamine formaldehyde resin.

In spite of substantial efforts in controlling aldehyde and other off odors and flavors in printing composition and resulting packaging materials, a substantial need exists to reduce release of contaminating off odors or off flavors. Further, a need to provide a lithographic fountain solution, a lithographic printing process, an over-coating for lithographic processes and a resulting lithographically printed product characterized by a reactive chemistry that traps or reduces release of a carbonyl compound arising from the coating, ink, fountain solution, printed legend, printed packaging material or process is extant.

SUMMARY OF THE INVENTION

We have found that liquid compositions used in manufacture or printing of packaging materials such as aqueous or solvent based coatings, aqueous fountain solutions used to dampen a lithographic printing plate, etc. can be improved by introducing a reactive chemistry component into the liquid material. After printing, the compositions of the invention can retain a residue comprising the reactive chemistry in the packaging layers. The reactive chemistry can substantially reduce the release of carbonyl compounds from any layer in or on a printed substrate. In the absence of a reactive chemistry, the printed residue derived from the ink and fountain solutions can release substantial off odors or flavors into materials contained within the substrate packaging. The lithographic printing processes using the improved fountain solution materials have reduced release of the carbonyl compound during and after printing is completed. In use, aqueous overprint coating compositions can be formulated to contain the reactive chemistries of the invention. Such aqueous coating compositions can be used to form a glossy or matte finish on the exterior surface of a printed material. The reactive chemistry used in forming the aqueous coating solution can act to prevent release of volatile carbonyl compounds from the printed material through the coating layer. The reactive chemistry of the invention can also be added to other aqueous materials used in the manufacture of the printed materials. We have further found that a printed substrate or container made from a flexible substrate such as paper or paperboard, can obtain the capacity to absorb offensive off odors or off flavors comprising a carbonyl compound by forming reactive layer on a surface of the substrate having the capacity to react with and absorb the carbonyl compound. The substrate, paper or paperboard, layer comprises on the exterior side, at the minimum, a lithographic ink layer.

Typically, the exterior of the printed structure comprises, at a minimum, beginning at the paperboard layer, a clay layer, the ink/fountain solution layer with an overcoat layer. After the complete formation of the printed substrate, a cyclodextrin barrier layer, can be used that can cooperate with the reactive layer to help in absorbing or trapping any carbonyl off odors or off flavors that migrate from the exterior of the paperboard through the cellulosic layer into the cyclodextrin layer preferable placed on the interior of the package. The cyclodextrin material, can be an unsubstituted or substituted cyclodextrin material. Such a cyclodextrin material can be incorporated into a layer on the interior of the printed substrate, on the exterior of the printed substrate in a defined layer separate from the clay layer, the ink/fountain solution layer, or the cyclodextrin can be distributed in any; compatible layer on the exterior printed side of the substrate. For the purpose of this patent application, the term "interior" indicates the side of the paper or the paperboard stock that forms the interior surface of a package or container. Such an interior surface is adjacent to the enclosed product. Conversely, the term "exterior" relates to the surface of the paper or the paperboard that ultimately forms the exterior of a paper layer or container surface. The term "organoleptic" refers to any mouth feel, nasal or oral sensation arising from ingesting a substance for any purpose. The term "comestible substance" refers to any material intended to be taken internally by mouth or through absorption in to the skin.

BRIEF DISCUSSION OF THE FIGURES

Figure 3:
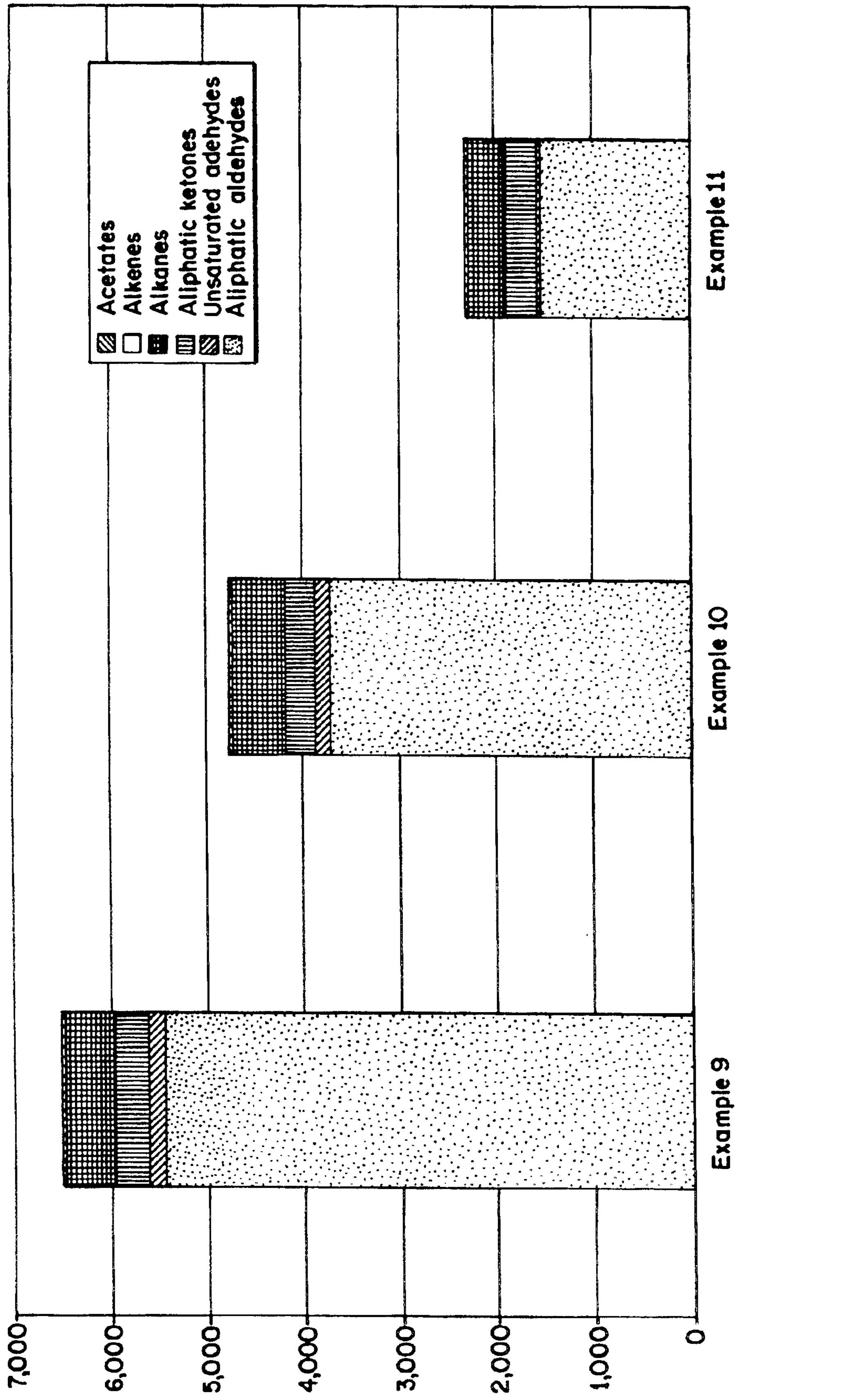

FIG. 3 similarly shows dynamic headspace analysis of the offset press test samples showing the effect of the process of the invention on reducing organic release.

DETAILED DISCUSSION OF THE INVENTION

A generic term planographic printing is used for a group of several printing methods that are all based on printing-image carriers on which the printing areas and non-printing areas are practically in the same plane. The planographic printing process, most often known as lithographic or offset lithographic printing, use a printing plate with image and non-image areas defined during manufacture. In lithography, the ability to apply printing ink to the image areas without, at the same time, applying it to the non-image areas is based on the well-known fact that grease and water do not mix readily. Printing inks for lithographic printing are hydrophobic (i.e.) quite greasy, and the printing-image carrier or plate is especially treated to make the printing areas ink receptive (oliophilic and hydrophobic). The non-image printing areas are made ink repellent (hydrophilic or lipophobic) under the same conditions. The thickness of the ink film formed for use on the image area in this process is about 0.5 to 10, preferably 1 to 2 $\mu$m. In lithographic printing, renewing and replacing the ink repellency of the non-printing areas is carried out with special water-chemical solutions, known as damping solutions, fount solutions or fountain solutions. These solutions maintain or renew the hydrophilic nature of the non-image printing area.

Lithography is a chemical printing method in which the interaction of the image plate cylinder, printing ink and fountain solution lead to the reproduction of images on printing stocks (e.g., printing paper, packaging board, metal foil and plastic sheet). One by-product of this process are residual Volatile Organic Compounds (VOC) from coatings, fountain solution components, ink solvents and vehicles. Many of these by-products have an extremely low odor/taste threshold (in parts per billion for organoleptic purposes) (e.g.) odor/taste detection by a human consumer of a food or drink. The printing on a food package can alter the apparent organoleptic character odor profile or flavor profile of food experienced by a human consumer. Even minor barely detectable changes can be objectionable if the change is one that the consumer is not expecting or is different than past experiences. Flavor alteration can occur directly from the food contacting the printed package or indirectly by package contaminant volatilizing or off-gassing in the environment surrounding the packaged food followed by permeation through a plastic package to the food, as in a plastic bag in box food package.

The reactive chemistries of the invention are designed to react with volatile organic carbonyl compounds. Such compounds typically include those materials that are sufficiently volatile to be released from packaging materials at a rate such that they can be detected by users. Typical compounds include aldehyde materials, ketone materials, carboxylic acid materials, and others. Aldehyde materials can include both alkyl, aliphatic and aromatic aldehydes including formaldehyde, acetylaldehyde, propanal, propenal, a pentenal compound, trans-2-hexeneal, a hepteneal compound, octanal, cis-2-nonenal, benzaldehyde, and others. Volatile ketone materials common in printed materials of the invention include relatively simple ketones such as acetone, methylisobutyl ketone, methyl ethylhexyl ketone, cyclohexanone, benzophenone and other ketones having aromatic, aliphatic or alkyl substituent groups. Further, examples of volatile reactive organic carbonyl compounds include volatile organic acids such as acetic acid, propionic acid, butyric acid, benzoic acid, various ethers thereof, various amides thereof, etc.

Lithographic sheet-fed presses and web offset presses are used to apply these solutions and inks in a chemical process to paperboard. Overall treatments or coatings are applied to webs of paperboard to improve optical properties and to provide a high quality-printing surface. The most common surface treatment for printing is clay-based pigmented coatings on paperboard materials. Printing ink is a complex mixture of ingredients combined in a specific formulation to meet desired characteristics. Lithographic offset and letterpress use printing inks that are classified as paste inks due to their relatively high viscosities. Most ink ingredients fall into three major classifications colorants (pigments or dyes), vehicles, and additives. The function of the colorant is to provide the visually significant white/black shading or chromatic properties of the ink. The vehicle is a liquid that holds and carries the dispersed colorant. A vehicle is a liquid of very special nature. The vehicle must remain liquid on the press and yet be completely dry on the stock. The vehicle must be capable of changing from the liquid state to the dry state very quickly. The basic lithographic printing ink vehicles include reactive drying oil and resins. The resin is added as a dispersion aid and also as a binder to affix the colorant to the substrate. The oil or carrier is the medium for transferring the colorant and resin through the press to the paper. Additives are used to control colorant wetting and dispersion, viscosity and flow characteristics, speed of ink drying, as well as to provide a proper ink/water (fountain solution) balance permitting the ink to emulsify with the fountain solution. The ink water balance ratio is an important part of quality printing.

As mentioned above, in the lithographic process, the plate is composed of two different areas: non-image (hydrophilic, or fountain solution loving) and image (oleophilic or oil loving, hydrophobic or oil hating) areas. Generally speaking, the ink fountain solution balance ratio is responsible for uniformly adhering the printed image to the stock, as well as for kind and speed of drying. Conventional lithographic inks used in a sheet-fed system typically comprise pigment and vehicle and have a (ASTM D4040) viscosity at 25° C. of less than about 500, or preferably about 50 to 400 P (poise) and letterpress 20–200 poise. Vehicles typically comprise drying oil based liquids. The preferable vehicle for such inks contain about 30 to 60 wt-% resin, about 5 to 40 wt-% unsaturated drying oil and sufficient solvent to obtain a useful viscosity in the solvent. The controlling factor in the speed of the lithographic printing process is often the speed and thoroughness of the drying of printing inks. Drying means changing the ink from a fluid to a solid state. Printing coated paperboard requires very fast drying of the inks. The acceleration of the ink drying is usually achieved by adding metallic dryers (usually Co, Pb, Mn) into the vehicle and by the raising of the drying temperature to around 100° F. Usually, the drying process take place in two steps.

Fount or fountain solutions also called damping or dampened solutions, are usually mildly acidic aqueous solutions containing colloidal materials such as alkali metal or an ammonium salts of di-chromic acid, phosphoric acid or a salts thereof. The solutions typically also contain, water-soluble, natural or synthetic polymeric compounds, such as gum Arabic, cellulose, starch derivatives, alginic acid and its derivatives, or synthetic hydrophilic polymers, such as polyethylene glycol, polyvinyl alcohol, poly vinyl pyrrolidone, polyacrylamide, polyacrylic acid, polystyrene sulfonic acid, and a vinyl acetate/maleic anhydride copolymer. Additionally, the fountain solutions can contain a variety of other additive materials that maintain pH, reduce corrosion, reduce microbial attack, improve water resistance to water hardness or other important formulation property. Every printing cycle in lithography requires dampening of the plate by the fountain solution before it can be inked so the ink receptive image is chemically or physically differentiated from the non-image area. The fountain solution is believed to maintain or restore the coatings formed on the non-image areas of the printing plate. Such non-image areas are made relatively hydrophilic during manufacture.

The first step is known as setting, the second as hardening of the ink film. When an ink film sets, the ink vehicle seeps into the porous structure of the clay coating and then into the fibrous structure of the paper. The ink pigment and resin gives a coating on the surface of the substrate. Setting means that the printed ink on the paperboard is not fully dry, but can be handled without smudging. The mostly physical absorption of the ink on the paperboard is followed by the final chemical transformation of the ink or hardening the ink film. The hardening chemical transformation of the offset lithographic ink is mainly the free radical oxidative polymerization of unsaturated drying oils contained in the vehicle. The conventional vehicle for lithographic inks usually includes natural fatty oils, largely composed of mixture of triglycerides. Oil viscosity increased thorough special pre-treatment by heating the oil to obtain more viscous so-called polymerized oils. To raise the viscosity of the oils, pre-treatment gives rise to the formation of the trace amount of the peroxide compounds. The present hydroperoxides are very unstable compounds and are very easily decomposed by the heat at the time of ink drying. Peroxides degradation lead to the origination of free radicals which can react with oxygen absorbed by oil from the air and forming the new hydroperoxide groups. A subsequent degradation of these peroxides leads to the initiation of new free radicals and to the process of autoxidation followed by a polymerization or drying the oils. The autoxidation is the reaction of molecular oxygen by a free radical mechanism with unsaturated hydrocarbon chains of drying oil.

The process of drying the ink vehicle oil can be described by the next four major steps characterizing autoxidation of lipids:

Initiation:

RH→R.+H.

Propagation:

$R.+O_2$→ROO. ROO.+RH→ROOH+R.

Branching:

ROOH→RO.+2RH+.OH→2R.+ROH+$H_2O$ (Monomolecular Decomposition)

2ROOH→ROO.+RO.+$H_2O$ Bimolecular Decomposition

Termination:

ROO.+ROO.→ROOR+$O_2$ R.+R.→R—R R.+ROO.→ROOR

From this scheme drying of the oils take place by loss of a hydrogen radical from the oil molecule due to reaction with radicals originating from the residual hydroperoxides by heat or by molecules of the metallic drier that act as a catalyst and speed the drying process. RH refers to any unsaturated oil molecule in which the hydrogen is labile by reason of its position on a carbon adjacent to a double bond. The oil free radical R. reacts very fast with oxygen to form peroxy free radicals, which in turn react with more oil molecules to form hydroperoxides and oil free radicals. The decomposition of the hydroperoxides by monomolecular or bimolecular processes (branching process) lead to a geometrical increase in free radicals. Termination process or the polymerization of the oil involves the elimination of free radicals by addition of two free radicals or transfer of the radical to a compound to form a stable radical. The combining of these relatively small oil molecules into larger, more complex molecules, the molecular weight of which is usually a multiple of that of small molecules at the stage of termination is the oxidative polymerization of the oil which leads to its drying. When the simple oil molecules comprise a fluid, polymerization generally results in a solid. Although a film of oil on the paperboard surface becomes touch-dry in a few seconds, the drying reactions in the capillary pores of clay coating continue for a long period of time and as cross-linking or polymerization proceeds so does progressive hardening. Drying of oils by the oxidative polymerization produces a multiplicity of low-molecular-weight volatile compounds.

The release of these compounds, mostly aldehydes, from the printing surface into the air is responsible for strong odor in the pressroom and in packaging it may cause tainting of the packaged food. Non-volatile organic compounds with strong nucleophilic reactive groups are capable of reacting with a strong electrophilic aldehyde group forming a non-volatile specie that can be held in the layer containing the non-volatile group. When reactive nucleophilic compounds are placed into a fountain solution formulation, they can subsequently infuse into the ink via the process of emulsification. As volatile aldehyde is formed from the ink vehicle by thermooxidative degradation, they instantaneously react with reactive chemistries infused into the ink via the fountain solution.

The most serious odor trouble long-term occurs when volatile aldehydes form in the capillary pores of the clay coating or paperboard fiber. The process of oil seeping into the clay capillary pores of the paperboard prior to drying is a slow process. This process is accompanied by oxidation of the ink vehicle and the slow diffusion of the volatile compounds from inside the printed paperboard in the direction of the both sides of the packaging. Due to the large surface area of the paperboard fiber, volatile transport is extremely slow. The amount of ink that seeps into the clay will determine how much of the aldehyde is released from the inner unprinted side or the printed side of the paperboard. Introducing reactive chemistries into the fountain solution allows transfer of the reactive materials by the emulsification into the ink. In the ink layer, the reactive materials can react with the aldehyde from the drying oils in all parts of the ink film including the capillary pores of the clay coating. Another second reactive Coating method may be used by itself or in combination with reactive fountain solution chemistries.

The reactive chemistry in the coating method inserts the reactive chemistries in the clear overprint water-based coating. Such coating compositions typically comprise vinyl polymers adapted for finish coating purposes. Such polymers are typically formulated into aqueous solutions that can also contain rapid drying solvent materials. Typical coating compositions comprise acrylic, sytrenic, or other polymers or mixtures thereof that can provide clear glossy or matte surface finishes that enhance the visual appeal of the printed legend. Homopolymers, copolymers, terpolymers, etc. can be used. One particularly useful polymer comprises an acrylic styrenic copolymer material having substantial clarity, flexibility and film forming properties. This coating is placed over the ink immediately following the last printing deck. The coating provides a smooth, glossy finish that protect the ink from rubbing and scuffing. As aldehyde off-gas from the ink layer under the overprint coating and diffuse thorough the acrylic coating over the ink, they react with nucleophilic chemicals dispersed in the coating eliminating their release from the coating surface.

Briefly, the invention contemplates a reactive chemistry used in a printing composition. The reactive chemistry limits or controls the release of volatile organo carbonyl compounds from the printed material. Aqueous materials that can contain the reactive chemistry include a fountain solution or a coating. A printing process, and a printed substrate can use the reactive chemistry to reduce or substantially prevent release of volatile contaminating carbonyl compounds. The reactive chemistries used in the printed layers of the invention include a reactive agent or reactant that can react with absorb or otherwise substantially trap volatile organic carbonyl compounds within the layer preventing substantial release of the material from the printed layer.

Broadly, any reactive chemistry that can react with such carbonyl compounds to form a solid product, a product with increased boiling point or a product with reduced vapor pressure or volatility. The reactive chemistries used in the aqueous materials of the invention must be soluble or at least dispersible in aqueous media while retaining sufficient reactivity to reduce carbonyl compound release. The reactive materials of the invention should not react with water to the extent that their ability to prevent release of the carbonyl compound is seriously diminished. Reactions useful to trap carbonyl compounds include reactive addition to HCN (hydrocyanic acid), reactive addition with sodium bisulfite, reactive addition with ammonia, reactive addition to urea, reactive addition with water, condensation with an acetylenic compound, nucleophilic addition to the carbonyl with the associated loss of water including formation of an acetyl, by condensation with an alcohol, formation of an oxide with a hydroxyl amine, formation of a substituted hydrazone with reaction with a hydrazine, base catalyzed condensation reactions including aldol condensations and Darzen's synthesis (reaction with alkyl chloroacetate) reactions, the oxidation of aldehydes and ketones to easily trap compounds and the reduction of aldehydes and ketones. Primary amines, heterocyclic amines, hydroxyl amine hydrazine, substituted hydrazines and hydrazides, compounds having the $H_2N$— group can react with aldehydes and ketones to give an imin >C═N— or shiff base. Other useful compounds include nucleic acid compounds, polypeptides, triazines, triazoles and substituted triazines and triazoles, hydrazines and substituted hydrazines, imidazolines and substituted imidazolines, semicarbazide compounds, thiocarbazide compounds, heterocyclic nitrogen bases, sulfonamide compounds, etc.

The components of the reactive chemistry are dissolved or dispersed throughout aqueous solutions used to make the printing materials. After the aqueous materials dry, the residue of the reactive chemistry is left in place on the substrate for reaction with carbonyl compounds. The residues can penetrate paper structure, penetrate clay formed layers, or other inorganic materials can remain within the structure of coating layers formed from aqueous coating materials or otherwise can remain a reactive component of the printed structure. For the purpose of the specification and claims herein, the term "residue comprising reactive chemistry" refers to a component formed in or on a coating or layer formed in a printing structure. The residue comprising the reactive chemistry contains a reactive material that can react with and bind the volatile carbonyl compound in the printing material.

Aldehydes, ketones, cyclic ketones such as cyclohexanone form addition compounds with hydrocyanic acid (HCN). The cyanohydrins are useful substances to trap carbonyl compounds through the addition reaction. An effective concentration of sodium alkali metal bisulfite ($MHSO_3$), the bisulfite commercially available typically consists of sodium metabisulfite —$Na_2S_2O_5$, having practically identical properties as true bisulfite materials. A substantial quantity of an alkali metal bisulfite in a layer formed from an ink or a fountain solution can interact with volatile carbonyl compounds and form a formaldehyde bisulfite, an aldehyde bisulfite, or a ketone bisulfite, fixing the volatile organic material in the bisulfite layer.

The reactive chemistries used in surface coatings and in the fountain solution are the compounds with strong nucleophilic reactive groups capable react with the strong electrophilic aldehyde groups. Useful electrophiles include a nitrogen containing electrophile. Useful compounds have a group:

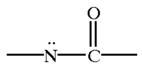

A preferred group of such nitrogen electrophiles include compounds includes urea, biuret, ammelide (6-amino-S-triazin-2,4-diol), ammeline (4,6-diamino-S-triazin-2-ol), melamine, cyanuric acid, benzoylhydrazine, pentafluorophenylhydrazine, oxalyldihydrazide (oxalic dihydrazide), nicotinic acid hydrazide, ethylhydrazinoacetate hydrochloride 2-hydrazino-2-imidazoline hydrobromide, 3-hydroxy-2-naphthoic acid hydrazide, methyl carbazate (methyl-oxycarbonyl-hydrazide), 1-acetylthiosemicarbazide, diphenylthiocarbazide, ethyl carbazate (ethyl-oxycarbonyl-hydrazide), 4-ethyl-3-thiosemicarbazide, 4-phenylsemicarbazide, iproniazide (4-pyridinecarboxylic acid-2-(1-methylethyl)hydrazide), thiosemicarbazone, dithiooxyamide, benztriazole, uridine, uracil, thymidine, thymine, 5,6-dihydroxyuracil, 5,6-dihydroxythymine, inosine, hypoxanthine, xanthine, xanthosine, uric acid (8-hydroxyxanthine), allantoin, guanine, guanosine, nicotinamide, orotic acid (uricil-6-carboxylic acid), urazole, glycoluril, hydantoin, 5,5-dimethylhydantoin, pyrrolid-2-one, pyrazol-3-one, imidazol-2-one, allopurinol, theobromine, 6-sulfanilamidoindazole, sulfadiazine, sulfamethazine, sulfamethoxasole, sulfasalazine, sulfisomidine, sulfisoxazole, benzenesulfonyl hydrazide, benzensulfonamide, 1,2,4,5-benzenetetracarboxamide, benzimidazole, oxazoline, 4-phenylurazole, 4,4'-oxydibenzenesulfonyl hydrazide, tert-butyl carbazate (t-BOC-hydrazide).

Thus, introducing reactive chemistries in fountain solutions, in overprint acrylic coatings, and in starch coating applied at the inner surface or in clay coating of the lithographically printed stocks permits considerably reduction in aldehydes on the printing surface thereby the release of aldehydes from both surfaces of the lithographically printed materials. The reactive chemistries can be dissolved or suspended into the aqueous media used in materials formulated for printing processes. An amount of the reactive chemistry effective to react with a slow or volatile organic carbonyl compound release is used in the aqueous formulations. The aqueous formulations can contain as much as 50 wt % of the reactive chemistry component. The reactive chemistry component can be dissolved or suspended into the aqueous formulations in an amount of from about 0.01 to about 40 wt %. 0.1 to preferably about 33 wt % or most preferred 0.5 to about 25 wt %.

Printable substrates include paper, paperboard, metal, metal foils, plastic, plastic films and other material that can accept and retain a printed flexographic image. The primary focus of the invention is on printed paper, paperboard or flexible film materials. Paper and paperboard are sheet materials made of discrete cellulosic fibers that are typically bonded into a continuous web. Cellulosic fibers derived from a variety of natural sources including wood, straw, hemp, cotton, linen, manila, etc. can be used in papermaking. Cellulose is typically a polymer comprising glucose units having a chain length of 500 to 5000. Paper is made by typically pulping a fiber source into an aqueous dispersion of cellulosic fibers. The pulp, typically in a Fourdrinier machine, forms a wet cellulosic layer on a screen which is then pressed, dewatered and dried into a paper or paperboard composition. Typically, paper structures have a thickness less than 305 μm while paperboard, a thicker material typically has a thickness that exceeds 300 μm (250 μm in the United Kingdom). Paper normally weights 30–150 $g/m^2$, but special applications require weights as low as 16 $g/m^2$ or as high as 325 $g/m^2$. At any given basis weight (gramage), paper density may typically vary from 2.2–4.4 $g/cm^3$, providing a very wide range of thicknesses. Paperboard typically is a material having a weight greater than about 250 $g/m^2$ of sheet material according to ISO standards. Commonly, paperboards are coated with a variety of materials to improve appearance, processability, printing capacity, strength, gloss or other material. Coatings are typically applied from aqueous or organic solution or dispersion. Coatings can often comprise pigments or other inorganic layers with binder materials which are typically natural or synthetic organic materials. Typical pigments include clay, calcium carbonate, titanium dioxide, barium sulfate, talcum, etc. Common binders include naturally occurring binders such as starch, casein and soya proteins along with synthetic binders including styrene butadiene copolymers, acrylic polymers, polyvinyl alcohol polymers, vinyl acetate materials and other synthetic resins.

One common structure used in or lithographic processes includes a paper or paperboard substrate, a clay layer (or other inorganic printable surface), a layer formed on and in the clay layer comprising ink or fountain solution with an acrylic overcoat layer providing protection for the ink and a glossy character if desired. Other layers can be used to improve or provide other properties or functions.

Lithographic printing processes are commonly used to provide an image on a metal object or foil or on a thermoplastic object or film. Metal foils and thermoplastic films are commonly available in the marketplace and typically have a thickness of about 5.1 μm to 127 μm, preferably 12.7 to 76 μm. Common synthetic materials including aluminum foils, polyethylene films, cellulosic acetate films, polyvinyl chloride films, and other materials.

Damping, fount or fountain solutions are typically aqueous materials that treat a lithographic plate to ensure that the hydrophobic ink materials reside in the appropriate plate location to form the correct image on the printed substrate. Fountain solutions are typically applied to a plate prior to the application of the hydrophobic ink for the purpose of creating a hydrophilic zone on the printing plate that is not wetted by the hydrophobic ink materials. Fountain solutions are carefully formulated to optimize damping properties of the material on the plate. Fountain solutions comprise pH modification and control compositions, flow control agents and stabilizers. Flow control agents reduce the surface tension of the water, maintain even damping for the non-image area of the plate, maintains the non-image area clean and promotes the formation of fine stable water in ink emulsions. Modifying and pH controlling materials aid in preventing corrosion, aid in preventing fungal or bacterial growth in reservoirs and maintains a uniform composition in the fountain solution.

The fountain solution composition according to the present invention comprise water-soluble polymers. Examples of the polymers include natural substances and modified materials thereof such as gum arabic, starch derivatives (for example, dextrin, enzyme decomposed dextrin, hydroxypropylated enzyme-decomposed dextrin, carboxymethylated starch, phosphorylated starch, octenylsuccinated starch), alginates, cellulose and derivatives thereof (for example, carboxymethyl cellulose, carboxyethyl cellulose, methyl cellulose, hydroxypropyl cellulose), and synthetic materials such as polyethylene glycol and copolymers thereof, polyvinyl alcohol and copolymers thereof, polyvinylpyrrolidone and copolymers thereof, polyacrylamide and copolymers thereof, polyacrylic acid and copolymers thereof, a vinyl methyl ether/maleic anhydride copolymer, and a vinyl acetate/maleic anhydride copolymer, and polystyrene sulfonic acid and copolymers thereof. The amount of the above-described other water-soluble polymers is preferably from 0.0001 to 0.1% by weight, more preferably from 0.001 to 0.05% by weight based on the fountain solution.

In the composition for a fountain solution according to the present invention, a water-soluble organic acid and/or an inorganic acid or salts thereof can be used as a pH buffering agent, and these compounds are effective for pH adjustment or pH buffering of the fountain solution, and for an appropriate etching or anti-corrosion of the support for lithographic printing plates. Preferred examples of the organic acid include citric acid, ascorbic acid, malic acid, tartaric acid, lactic acid, acetic acid, gluconic acid, hydroxyacetic acid, oxalic acid, malonic acid, levulinic acid, sulfanilic acid, p-toluene sulfonic acid, phytic acid and organic phosphonic acid. Preferred examples of the inorganic acid include phosphonic acid, nitric acid, sulfuric acid and polyphosphonic acid. In addition, alkali metal salts, alkaline earth metal salts, ammonium salts or organic amine salts of these organic acids and/or inorganic acids can be suitably used, and these organic acid, inorganic acids and/or salts thereof may be used alone or as a mixture of two or more of these compounds. The amount of these compounds contained in the fountain solution is preferably from 0.001 to 0.3% by weight. The fountain solution is preferably used in an acidic range at a pH value of from 2 to 7. Less commonly it may be used in an alkaline range at a pH value of from 7 to 11 if formulated containing alkali metal hydroxide, phosphoric acid, an alkali metal salt, a metal salt of alkali carbonate or a silicate salt.

Optionally, the fountain solution compositions can contain a nonionic surfactant material typically comprising polymeric material comprising an ethylene oxide and/or polypropylene oxide. Such surfactant materials can be block or heteric copolymers of ethylene oxide and propylene oxide. Further, the materials can be grafted onto a relatively hydrophobic group that can comprise an alcohol residue, an acid residue, an aromatic residue, or other residue. One useful ingredient of a fountain solution can be an ethylene oxide or propylene oxide adduct of 2-ethyl-1,3-hexanediol or a similar adduct of an acetylene alcohol or acetylene glycol. Such materials adjust the fluid properties of the materials to ensure the fountain solution and inks mix as little as possible. Other surfactants can be used in the fountain solutions of the invention including anionic surfactants such as sulfonate materials including alkane sulfonates, alkyl benzene sulfonates, fatty acid salts, alkyl naphthalene sulfonic acid materials, alkyl sulfosuccinic acid salts, petroleum sulfonates, alkyl sulfonates, alkyl ether sulfonates, related phosphonates, anionic polymeric materials and others. Silicone and fluorine surfactants can be used.

The fountain solutions of the invention can contain a sequestering or chelating compound such as EDTA, nitrilotriacetic acid, 1-hydroxyethane-1,1-diphosphonic acid, phosphonoalkane tricarboxylic acid, sodium tripolyphosphonate, zeolites and others.

The fountain solution can also contain an alcohol or ether material that can be used to regulate the rate of evaporation of the fountain solution after application. Further, the invention can contain a solvent material that can affect the wetting of the surfaces. Such hydroxy and ether compounds include ethanol isopropanol, ethylene glycol, butylene glycol, hexylene glycol, glycerin, diglycerin, and other mono-, di- and trihydroxy compounds. Suitable ether type solvent materials include ethylene glycol monomethyl ether, diethylene glycol monomethyl ether, diethylene glycol monoethyl ether, triethylene glycol monoethyl ether, ethylene glycol monoethyl ether and other related ether alcohol solvent materials. The hydroxy and ether alcohol or solvent materials in the invention can be used singly or in admixture in amounts that range from about 0.01 to about 5 wt % of the composition, typically 0.1 to 3 wt %.

General formulae for a fountain solution of the invention can be made according to the following table:

TABLE 1

Fountain Solution Use Formulations

| Ingredient in Aqueous medium | Useful Amount Wt.- % | Preferred Amount Wt.- % | Most Preferred Amount Wt.- % |
|---|---|---|---|
| Water soluble polymer | 0.0001 to 0.1 | 0.0005 to 0.05 | 0.001 to 0.01 |
| Buffer-pH modifier | — | 0.001 to 0.5 | 0.01 to 0.1 |

TABLE 1-continued

| Fountain Solution Use Formulations | | | |
| --- | --- | --- | --- |
| Ingredient in Aqueous medium | Useful Amount Wt.- % | Preferred Amount Wt.- % | Most Preferred Amount Wt.- % |
| Sequestrant | — | 0.001 to 1 | 0.0001 to 0.5 |
| Surfactant | — | 0.0001 to 0.5 | 0.001 to 0.1 |
| Functional Additive | — | 0.0001 to 1 | 0.001 to 0.5 |
| Carbonyl reactive chemistry component | 1–40 | 5–33 | 10–25 |

Concentrate compositions can easily be made of all or a selection of the ingredients by blending a concentrate at increased concentration.

Over-Print Coating

The reactive chemistry materials of the invention can be used in aqueous overprint coating solutions. When combined in an aqueous overprint coating solution, the reactive chemistries can prevent migration of carbonyl compounds from a printed region through the overprint coating and away from the printed material. The overprint coating materials of the invention are typically aqueous emulsions of polymeric material such as acrylic or common copolymeric materials. Overprint coatings or varnishes may also contain a hydrocarbon wax and other ingredients that improve the application, finished coating appearance, gloss or matte appearance. Overprint coatings can contain surfactants or emulsifiers that can be used to establish or maintain dispersions of copolymers and other ingredients in aqueous solution. Natural, synthetic or other polyethylene waxes can often be used in the overprint coating to improve the waterphobic or watershedding aspect of the invention.

General formulae for a coating solution of the invention can be made according to the following table:

TABLE 2

| Overprint Coating Solution Use Formulations | | | |
| --- | --- | --- | --- |
| Ingredient in Aqueous or Solvent Medium | Useful Amount Wt.- % | Preferred Amount Wt.- % | Most Preferred Amount Wt.- % |
| dispersible polymer or copolymer | 0.0001 to 0.1 | 0.0005 to 0.05 | 0.001 to 0.01 |
| Sequestrant | — | 0.001 to 1 | 0.0001 to 0.5 |
| Surfactant | — | 0.0001 to 0.5 | 0.001 to 0.1 |
| Functional Additive | — | 0.0001 to 1 | 0.001 to 0.5 |
| Carbonyl reactive chemistry component | 0.01–3 | 0.1–2 | 0.5–1 |

Concentrate compositions can easily be made of all or a selection of the ingredients by blending a concentrate at increased concentration.

Printing Inks

Printing inks typically comprise a dispersion of coloring matter in a vehicle or carrier which forms a fluid or paste which can then be transferred to a substrate, dried in the form of an image on the substrate. Colorants used in such mixtures include pigments, toners, dyes or combinations thereof. Vehicles typically act as a carrier for the colorant. Printing inks are typically applied as thin films on the substrate which rapidly dry to a non-smudging permanent image. Important properties of the inks of the invention include rheology, viscosity or flow, drying properties, color properties and typical end use substrates. Inks typically include pigments, dyes, driers, waxes, antioxidants and miscellaneous additives. Such additives can include lubricants, surfactants, thickeners, gels, defoamers, stabilizers and preservatives. The minimum formulation of such an ink comprises a pigment or colorant and a vehicle. Vehicles typically comprise resins, solvent and additives. Solvents act to dissolve the resin, reduce viscosity and evaporate to promote image formation. Both organic and inorganic pigments and colorants are commonly used in modern liquid dyes.

Typical vehicle systems comprise an unsaturated vegetable oil combined with optional resins, alkyd materials, and solvents commonly high boiling petroleum distillates. Typical vegetable oils include triglyceride oils comprising the reaction product of one molecule of glycerol with three molecules of typically an unsaturated fatty acid having from 12 to 22 carbon atoms. The oils are typically dried by crosslinking of adjacent glyceride molecules, typically through oxygen attack on an activated methylene group alpha to an unsaturated bond. Such reactive systems promote crosslinking between fatty moieties resulting in substantial solidification of the vehicle. Such crosslinking reactions are promoted using inorganic accelerators or catalysts. Resins that can be used in typical vehicles include rosin materials such as pine resins or gums, wood rosins, tall oil rosins, gum rosins, etc. A phenolic and a resin modified phenolic resin have been used in vehicles for known purposes. Other resins that can be used in vehicles include hydrocarbon resins, terpene resins, acrylic polymers, cyclized rubber, alkyd resins and others. Typical vehicles can be combined with petroleum distillates. Both paraffinic and naphthenic distillates can be used. Typically, the boiling points of these distillates range from about 240 to 320° C. The printing inks with complex organic components of the ink formulations can be a source of volatile organic carbonyl compounds. These volatile materials can be trapped by residues of the reactive chemistries formed using the fountain solutions of the invention or the coating compositions of the invention.

Experimental

We have tested the effectiveness of both an active press fountain solution chemistry and an active overprint coating chemistry for reducing the release of organoleptically objectionable ink oxidation products such as aldehydes and ketones. A designed experiment was conducted to measure the affect of active press fountain solution chemistries and active overprint coating chemistries in eliminating residual ink and board odors.

| MATERIALS TESTED | |
| --- | --- |
| Raw Material Identification | Raw Materials Manufacturer |
| SBS Paperboard | Fort James Corporation |
| 1245C Acrylic Overprint | Coatings & Adhesives Corporation |
| FC3 Fountain Solution | Press Color, Inc. |
| Lithographic Ink | Sun Chemical |

-continued

| | |
|---|---|
| Benzoic Hydrazide | Aldrich Chemical Company |
| Guanidine Sulfate | Aldrich Chemical Company |
| Urea | Aldrich Chemical Company |

TEST MATERIAL

| Ingedient | wt.- % |
|---|---|
| 1245C Acrylic Coating | |
| Acrylic-Styrene Copolymer | 35–37 |
| Amm. Hydroxide 28% | 1–5 |
| Wax | 0–12 |
| Surfactant | 1–3 |
| Defomer | 0.1–0.5 |
| ZnO | 0.0–0.7 |
| FC3 Fountain Solution Concentrate | (diluted 1:32 with water) |
| Polyalkoxylated polyether | 0.7–1.5 |
| Nonionic surfactant | 0.1–0.15 |
| Hydroxypropyl cellulose gum | 3–10 |
| Polyethylene glycol wax | 0.6–0.8 |
| Cellulose gum | 12–20 |
| Potassium nitrate | 0.7–2.0 |
| Sulfuric acid | 0.09–0.2 |
| Sodium benzoate | 0.1–2.0 |
| Magnesium sulfate | 0.03–2.0 |
| Gum arabic | 0.9–2.0 |
| Citric acid | 2.0–2.5 |
| Sodium bisulfate | 0.2–0.3 |
| Water | 59–83 |
| Lithographic Ink | |
| Pigment | 70–80 |
| Unsaturated oil (tung oil/vegatable oil0 | 17–27 |
| Wax | 0–3 |
| Catalyst (cobalt nitrate or cerium drier) | 0.2–0.6 |

Preparation of Laboratory Test Articles

| | |
|---|---|
| Paper Board: | Solid Bleached Sulfite (SBS) - 20 caliper paperboard from Fort James Corporation, Pennington, AL mill. Samples cut to 27" × 30". |
| Litho Ink: | Yellow from Sun Chemical. Carlstadt, NJ 07072 |
| Control Overprint Coating: | 1245C, water based styrene acrylic copolymer that is 47% solids from Coatings and Adhesives Corporation, Leland. NC 28451 |
| Exemplary Test Overprint Coatings: | 1245C Coating with:<br>Benzoic Hydrazide 1.0%;<br>Benzoic Hydrazide 0.5%;<br>Guanidine-sulfate 2.5%;<br>Urea 10%; and<br>Benzoic Hydrazide 0.5% and Urea 5% |

All additions to 1245C water-based overprint are on a percent wet wt. basis. Test coatings are prepared at room temperature using moderate agitation for 30 minutes to insure complete dissolution.

| | |
|---|---|
| Control Fountain Solution: | FC3 (Press Color Inc., Appleton. WI 54915) |
| Test Fountain Solution: | FC3 with 33% Urea |

The control fountain solution is diluted 1 part FC3 to 29 parts with deionized water. The test fountain solution is diluted 1 part FC3 to 19 parts deionized water and 10 parts urea and the pH adjusted to 3.9 with $H_2SO_4$.

Laboratory Preparation of Paperboard with Ink and Overprint Coating: 20 grams of ink are combined with 20 grams of the dilute fountain solution in a mortar and intimately mixed using a pestle for 5 minutes. The excess fountain solutions is then drained and a small amount of this ink is printed on to the clay coated side of the SBS board in a continuous uniform layer using a soft rubber printing roller. The ink is air dried for 30 minutes and then the 1245C coating is applied with a No. 2.5 drawdown rod from Industry Tech of Oldsmar, Fla. The coating is dried for 30 minutes at room temperature and then 1.75 inch diameter disks (2.4 $in^2$) are cut from the boards, immediately placed inside a 250 ml I-Chem bottle and capped. Table 3 provides a summary of the laboratory test design.

TABLE 3

Laboratory Example Test Article Summary

| Example No. | Type of Paperboard | Reactive Chemistry in Overprint Coating | Reactive Chemistry in Fountain Solution |
|---|---|---|---|
| 1 | SBS | None | None |
| 2 | SBS | 1% Benzoic Hydrazide | None |
| 3 | SBS | 0.5% Benzoic Hydrazide | None |
| 4 | SBS | 0.5% Benzoic Hydrazide | 33% Urea |
| 5 | SES | 2.5% Guanidine Sulfate | 33% Urea |
| 6 | SBS | 10% Urea | 33% Urea |
| 7 | SBS | None | 33% Urea |
| 8 | SBS | 0.5% Benzoic Hydrazide & 5% Urea | 33% Urea |

Analytical Summary of Board Volatiles

Static Jar Headspace Analysis of Laboratory Test Articles

Volatile compounds in the example laboratory test samples out-gas into the jar's headspace during confinement. These volatiles are then analyzed in an aliquot of air taken from the jar's headspace and the individual components subsequently identified and quantitated by static headspace gas chromatography/flame ionization detection (GC/FID).

A single 1.75 inch diameter disk (2.4 $in^2$) is placed inside a 250 ml I-Chem bottle, capped with a septum port lid screwed onto the bottle was ready for sample conditioning. Two sample sets of the eight examples in Table 3 were prepared. For the first sample set, samples are conditioned by placing the bottle into a controlled environment maintained at 100° F. (38° C.) for 24 hours then removed and held at ambient temperature for 24 hours prior to analysis by static headspace gas chromatography using flame ionization detection. The second sample set, samples are conditioned by placing the bottle into a controlled environment maintained at 100° F. (38° C.) for 120 hours then removed and held at ambient temperature for 24 hours prior to analysis by static headspace gas chromatography using flame ionization detection. Table 4 provides a summary of the analytical results for the samples conditioned at 48 hours. Table 5 provides a summary of the analytical results for the samples conditioned at 48 hours. Table 4 concentrations are based on $\mu$m (microliter volume) of analyte in the jar headspace expressed as $\mu$L/L (volume/volume) or parts per million. Test results in Table 3 and Table 4 are plotted in FIGS. 1 and 2 stacked bar graphs, respectively.

Equipment for Static Headspace Analysis

Gas chromatograph (HP 5880) equipped with flame ionization detector, a six-port heated sampling valve with 1 ml sampling loop (Aspen Research Corporation), and data integrator.

J&W capillary column DB-5, 30M×0.25 mm ID, 1.0 umdf.

Calibration Standards

Calibration standards (acetaldehyde, propanal, pentanal, hexanal and benzaldehyde) are prepared at a minimum of three concentration levels by adding volumes of the working standard to a volumetric flask and diluting to volume with reagent water. One of the standards is prepared at a concentration near, but above, the method detection limit. The other concentrations correspond to the expected range of concentrations found in the sample headspace.

Instrument Parameters

Standards and samples are analyzed by gas chromatography using the following method parameters:

Column: J&W column, DB-5, 30 M, 0.25 mm ID, 1 umdf

Carrier: Hydrogen

Split Vent: 9.4 ml/min

Injection Port Temp: 105° C.

Flame Detector Temp: 300° C.

Oven Temp 1: 40° C. no hold

Program Rate 1: 15° C.

Oven Temp 2: 125° C., no hold

Rate 2: 20° C.

Final Oven Temp: 220° C.

Final Hold Time: 0 Min

The six-port sampling valve temperature is set to 105° C.

Test Compound Response Factor

Test compound concentrations are calculated for each compound's calibration curve slope or response factor (RF). Concentrations are then volume-corrected for the 250 ml I-Chem bottle volume.

$$\text{Concentration of Compound in ppm} = \frac{\text{Peak Area}}{\text{Calibration Curve Slope}}$$

$$\text{Compound Specific } RF = \frac{\text{Concentration of Compound in ppm}}{\text{Peak Area}}$$

$$\text{Concentration of Compound in ppm} = \text{Peak Area} \times RF$$

TABLE 4

Figure 1:
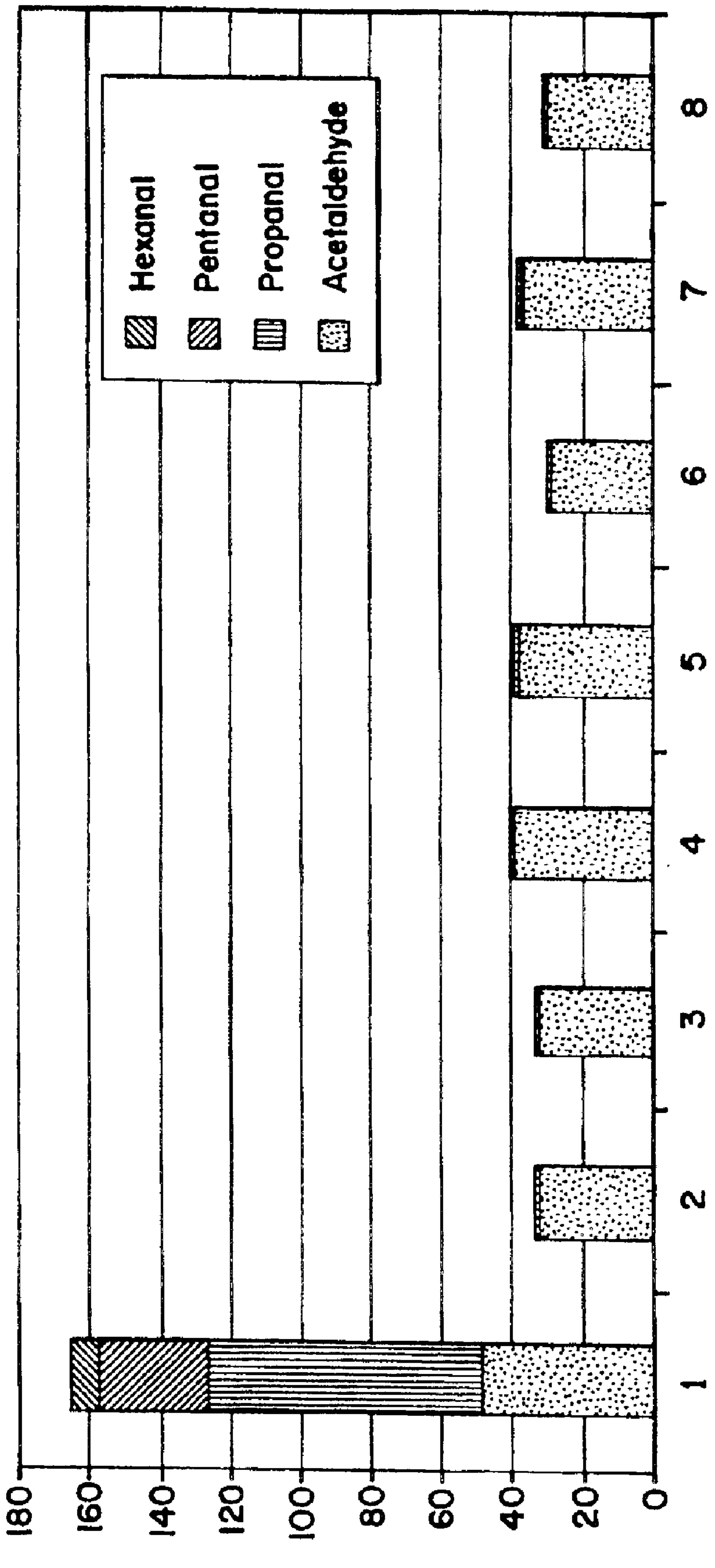
FIG. 1 is a chart showing the volatile organic content including aldehyde content of the static jar headspace analyzed after storing the test articles for a defined period of time.
Figure 2:
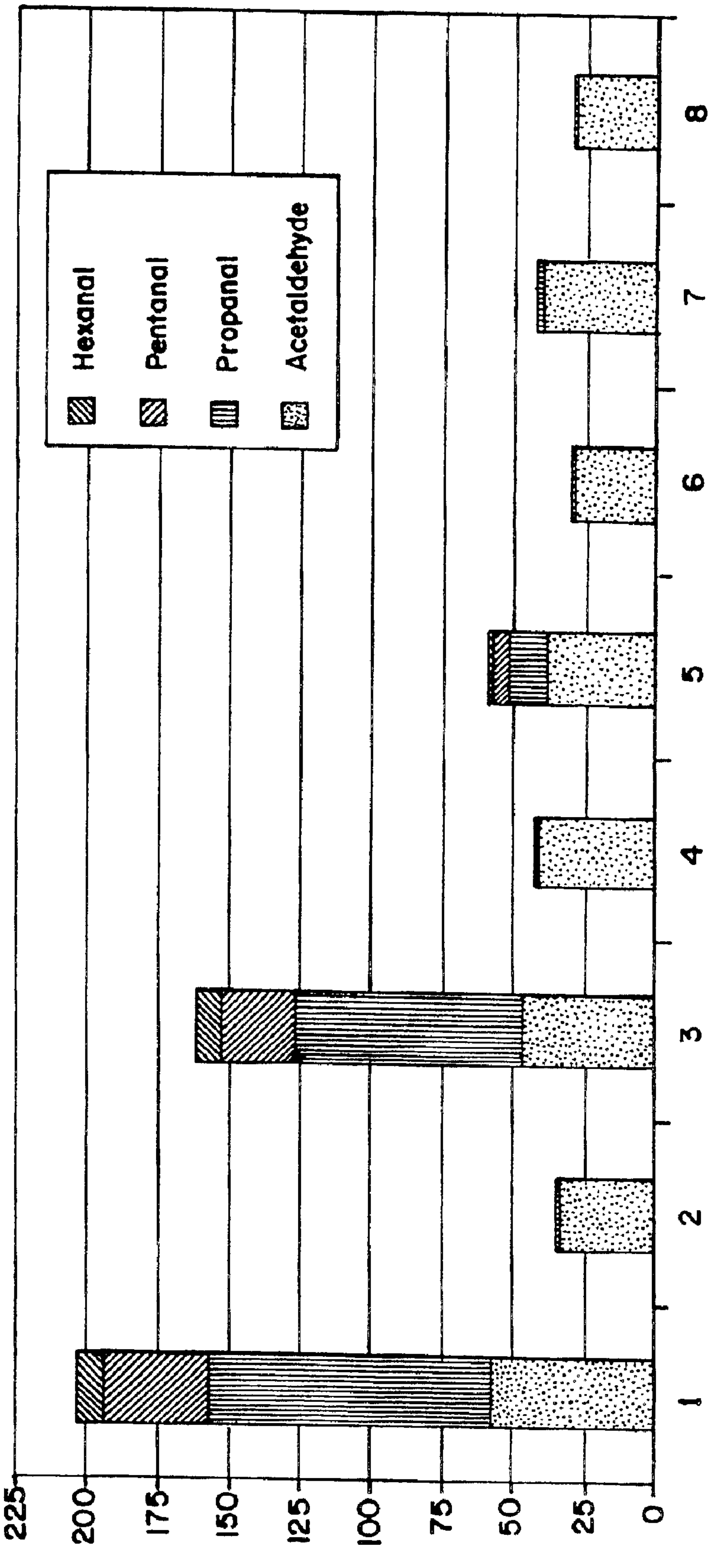
FIG. 2 is a similar chart for static headspace or aldehyde analysis showing the effects of the invention in reducing aldehyde content over a greater period of time.

48 Hour Static Jar Headspace GC Analytical Results for Laboratory prepared Test Articles (These data are shown in FIG. 1)

| Example No. | Acetaldehyde μL/L (V/V) | Propanal μL/L (V/V) | Pentanal μL/L (V/V) | Hexanal μL/L (V/V) | Benzaldehyde μL/L V/V) | Total Aldehydes μL/L (V/V) |
|---|---|---|---|---|---|---|
| 1 | 49 | 77 | 31 | 8.2 | 0.06 | 166 |
| 2 | 32 | 1.5 | ND | ND | 0.01 | 34 |
| 3 | 33 | 1.5 | 0.29 | 0.05 | 0.01 | 34 |
| 4 | 40 | 1.3 | ND | ND | ND | 41 |
| 5 | 37 | 2.1 | 0.72 | 0.16 | 0.01 | 40 |
| 6 | 29 | 1.2 | 0.11 | 0.04 | ND | 31 |
| 7 | 37 | 1.0 | 0.14 | 0.05 | ND | 38 |
| 8 | 30 | 0.98 | 0.06 | 0.02 | ND | 31 |

μL/L = Parts Per Million (Volume/Volume) ND = Not Detected

The date in Table 4 shows that Example 1 with no reactive chemistry on either the overprint coating nor the fountain solution has substantial aldehyde release into the static jar headspace. Total aldehyde content in Example 1 without the reactive chemistry exceeds 160 ppm (Volume/Volume). Examples 2–8, using the reactive chemistry in either the overprint coating, the fountain solution, or both, have less than 41 ppm total aldehyde in a volume per volume basis. This represents a substantial reduction in headspace aldehyde release. The data shows that placing the reactive chemistry in the overprint coating is effective for aldehyde reduction (see Examples 2 and 3). Further, the use of the reactive chemistry in the fountain solution is effective in aldehyde reduction (see Example 4).

TABLE 5

144 Hour Static Headspace GC Results

| Example No. | Acetaldehyde μL/L V/V) | Propanal μL/L V/V) | Pentanal μL/L V/V) | Hexanal μL/L (V/V | Benzaldehyde μL/L V/V | Total Aldehydes μL/L (V/V) |
|---|---|---|---|---|---|---|
| 1 | 57 | 100 | 36 | 9.5 | 0.06 | 203 |
| 2 | 33 | 1.7 | 0.03 | 0.01 | 0.01 | 35 |
| 3 | 46 | 81 | 27 | 8.3 | 0.07 | 162 |
| 4 | 40 | 1.6 | 0.09 | 0.05 | 0.01 | 42 |
| 5 | 38 | 14 | 5.1 | 1.7 | 0.03 | 59 |
| 6 | 28 | 1.7 | 0.50 | 0.12 | 0.01 | 30 |
| 7 | 39 | 3.3 | 1.6 | 0.40 | 0.01 | 44 |
| 8 | 28 | 1.5 | 0.40 | 0.08 | 0.01 | 30 |

μL/L = Parts Per Million (Volume/Volume)
ND = Not Detected

The 144 hour test data mirrors the data of Table 5. Examples 2 and 4 through 8 all show substantial reductions in aldehyde content using the reactive chemistry of the invention in the overprint layer, the fountain solution layer or both. Example 3 using only 0.5% benzoic hydrazide in only the overprint coating apparently was swamped by aldehyde leaving some substantial amount of aldehyde in the headspace. However, the use of 1% benzoic hydrazide shows that this amount of reactive chemistry is sufficient to substantially reduce aldehyde release.

Preparation of Offset Press Test Articles

The following is a description of the press conditions used to print samples for an analysis of odor and sensory reduction that is the norm when utilizing the offset lithographic printing process and commercially used offset sheet fed oil oxidizing inks. All tests were conducted under standard commercial conditions used in operating an offset lithographic press.

The press utilized for this particular trial was a 6 color Heidelberg Speedmaster Multicolor offset printing press —71×102 cm (28"×40"). The films used to produce the litho printing plates were a commercial set of films that had previously been used for a production run of candy item cartons. The films used called for 5 colors (5 different litho printing ink colors). A water based aqueous overprint coating was used in the last (6th) unit of the press for the purposes of adding rub protection to the inks and for higher printed gloss. Viscosity of the water based aqueous coating was 18 seconds with a #3 Zahn cup.

The printing press was equipped with EPIC Dampeners without a bridge roll. Buffered fountain solutions (pH 4.5) common to all units of the press was utilized for the trial. The fountain solution was supplied byPress Color from Appleton, Wis.

An Electro Sprayer System's, Inc. Accutron Short-wave Infrared Dryer was used after the last or 6th unit to assist in the drying of the water based aqueous coating. This unit was set at an operating level of 35% throughout the trial. A minimal amount of starch spray powder (Varn Products #C-270) was applied to the printed sheets using an Oxy-Dry Powder applicator.

Color rotation for the application of the litho inks was process blue, process red, process yellow, special line brown and special background yellow. The tack values of these inks ranged from 16 (as measured on an Inkometer at 90 deg, 1200 RPM at 1 minute) for the 1st down process blue to 11 for the last down background yellow. The film thickness of the process colors was in the range of 0.3 to 0.5 mils. The 2 special line colors were run at a film thickness of 0.5 to 0.8 mils. These are standard operating ranges for both process colors and special colors for an offset lithographic press.

Conventional ink distribution rollers as well as conventional printing blankets were used. There was nothing used that would be different to the ordinary for this type of printing equipment. A relief plate was used to apply the water based aqueous coating.

Delivery pile height for all variables was maintained at 30" during this trial. The press was operated at a speed of 5000 sheets per hour. The size of the paperboard used for the trial was 27"×30" with a caliper of 0.020". The printed sheets were maintained in piles for 24 hours before being aerated cut and wrapped for odor.

TABLE 6

Offset Press Example Test Article Summary

| Example No. | Type of Paperboard | Reactive Chemistry in Overprint Coating | Reactive Chemistry in Fountain Solution |
|---|---|---|---|
| 9 | SBS | None | None |
| 10 | SBS | None | 33% Urea |
| 11 | SBS | 1% Benzoic Hydrazide | 33% Urea |

Analytical Summary of Printed Board Volatiles

Dynamic Headspace GC/MS Analysis of Offset Litho Press Articles

Residual volatile compounds in the example litho offset press sample are emitted into the jar's headspace during confinement. The volatiles emitted into the headspace are purged from the headspace at ambient temperature, trapped on a Tenax column, stripped from the column and subsequently analyzed by high resolution gas chromatography/mass spectrometry.

Printed paperboard samples are cut into 4"×5" pieces. The paperboard test articles are rolled and placed into a 250 ml I-Chem bottle. Sample bottles are placed into a controlled environment maintained at 100° F. for 24 hours. After 24 hours at 100° F. the samples are removed from the controlled environment and held at ambient for 16 hours prior to analysis. Following sample conditioning, the headspace bottle is transferred to a purge and trap sampler (Hewlett Packard Model 19395A) interfaced via directly to a Hewlett Packard 5890 gas chromatograph. Volatiles which have outgassed into the bottle are then purged from the bottle's headspace and the individual components subsequently identified and quantitated by dynamic headspace high resolution gas chromatography/mass spectrometry (GC/MS). Identification of unknown sample analytes (a specific list of 74 analytes was used) is made by their chromatographic retention time (in minutes) and their mass spectra (compared to standard reference material spectra). Quantitation of test analytes is based upon each analytes response factor to an internal standard. Table 7 provides a summary of the offset press sample GC/MS analytical results. Analyte concentration in Table 7 is based on ng (weight) of analyte recovered by dynamic headspace per gram of paperboard—ng/gram of paperboard (weight/weight) or parts per billion. Test results in Table 7 are plotted in FIG. 3 stacked bar graph.

FIG. 3 shows that the reactive chemistry used in the fountain solution or in both the overprint coating and the fountain solution can be effective in reducing aldehyde release. Example 9, having no reactive chemistry in any layer, releases a substantial proportion greater than 6000 ppb aldehyde in the headspace. The use of a small amount of urea in the fountain solution reduces the aldehyde release substantially in Example 10. Example 11 using the reactive chemistry in both the overprint coating and the fountain solution successfully and substantially reduces aldehyde release as shown in FIG. 3.

Paperboard Analysis by Dynamic Headspace High Resolution GC/MS

| | |
|---|---|
| Sample Introduction: | |
| Purge time: | 15 min. |
| Purge flow: | Helium at 33 mL/min |
| Trap: | No. 4 (OI Corp) |
| Desorb: | 2 min. at 185° C. |
| Valve temp: | 150° C. |
| Transfer line: | 150° C. |
| Gas Chromatograph: | |
| Column: | DB-5 (30 m × 0.20 mm, 0.8 micron film) |
| Flow rate: | Hydrogen at 35 mL/min. |
| Injector: | 250° C. |
| Initial temp: | 10° C. |
| Initial hold: | 5 min. |
| Temp ramp: | 6°/min. |
| Final temp: | 185° C. |
| Analysis: | 34 mm. |
| Mass Spectrometer: | |
| HP 5970 Mass Range: | 33–260 emu (full scan) |
| Standards | |
| Internal Std: | 1,4-Difluorobenzene, Chlorobenzene-d5 |
| Surrogate: | Bromochloromethane, Naphthalene-d10 |

TABLE 7

Dynamic Jar Headspace GC/MS Results for Offset Press Test Articles

| Sample ID: Aspen ID: Analyte | EQL ng/g | Example A ng/g | Example B ng/g | Example C ng/g |
|---|---|---|---|---|
| Aliphatic alcohols | | ND | ND | ND |
| Isopropanol | 1.3 | ND | ND | ND |
| 2-Heptanol | 40 | ND | ND | ND |
| 1-Octanol | 6.7 | ND | ND | ND |
| 1-Nonanol | 13 | ND | ND | ND |
| Aliphatic aldehydes | | 5431 | 3705 | 1534 |
| Propanal | 1.3 | 3127 | 2086 | 926 |
| Isobutyraldehyde | 2.0 | 7.2 | 5.6 | 2.0 |
| Butanal | 1.3 | 150 | 144 | 53 |
| Isovaleraldehyde | 3.3 | 2.0 | 1.2 | 0.5 |
| 2-Methylbutanal | 2.0 | ND | ND | ND |
| Pentanal | 1.3 | 1555 | 1107 | 411 |
| Hexanal | 2.0 | 537 | 322 | 119 |
| Heptanal | 3.3 | 17 | 11 | 3.8 |
| Octanal | 2.0 | 21 | 18 | 10 |
| Nonanal | 20 | 15 | 10 | 8.7 |
| Aromatic aldehydes | | ND | ND | ND |
| Benzaldehyde | 1.3 | ND | ND | ND |
| Phenylacetaldehyde | 13 | ND | ND | ND |
| Unsaturated aldehydes | | 167 | 156 | 23 |
| Acrolein | 3.3 | 21 | 43 | 4.3 |
| tr-2-Butenal | 3.3 | 6.9 | 5.7 | 0.6 |
| tr-2-Pentenal | 6.7 | 24 | 18 | 2.7 |
| tr-2-Hexenal | 6.7 | 25 | 20 | 3.6 |
| tr-2-Heptenal | 3.3 | 90 | 69 | 12 |
| tr-2,cis-6-Nonadienal | 3.3 | ND | ND | ND |
| tr-2-Nonenal | 40 | ND | ND | ND |
| tr-2,tr-4-Nonadienal | 13 | ND | ND | ND |
| re-2,tr-4-Decadienal | 6.7 | ND | ND | ND |

TABLE 7-continued

Dynamic Jar Headspace GC/MS Results for Offset Press Test Articles

| Sample ID:<br>Aspen ID:<br>Analyte | <br>EQL<br>ng/g | Example<br>A<br>ng/g | Example<br>B<br>ng/g | Example<br>C<br>ng/g |
|---|---|---|---|---|
| Aliphatic ketones | | 20 | 11 | 10 |
| Acetone | 1.3 | ND | ND | ND |
| 2,3-Butanedione | 1.3 | 1.9 | 1.5 | 1.2 |
| 2-Butanone | 1.3 | ND | ND | ND |
| 4-Methyl-2-pentanone | 1.3 | 7.1 | 4.8 | 5.8 |
| 3-Hexanone | 2.0 | 0.7 | 0.2 | 0.2 |
| 2-Hexanone | 3.3 | 3.0 | 1.6 | 0.2 |
| 3-Heptanone | 3.3 | 2.9 | 1.4 | 0.9 |
| 2-Heptanone | 6.7 | 4.0 | 2.0 | 1.6 |
| Unsaturated ketones | | ND | ND | ND |
| 1-Hepten-3-one | 1.3 | ND | ND | ND |
| 1-Octen-3-one | 2.7 | ND | ND | ND |
| 1-Nonen-3-one | 13 | ND | ND | ND |
| Aromatics | | 331 | 285 | 294 |
| Benzene | 1.3 | 0.9 | 0.4 | 30 |
| Toluene | 1.3 | 9.2 | 8.5 | 6.4 |
| Ethylbenzene | 2.0 | 3.2 | 2.6 | 0.8 |
| m,p-Xylene | 1.3 | 6.2 | 4.8 | 4.6 |
| Styrene | 3.3 | 30 | 22 | 15 |
| o-Xylene | 2.0 | 8.7 | 6.8 | 6.4 |
| Isopropylbenzene | 3.3 | 6.6 | 5.1 | 6.9 |
| n-Propylbenzene | 1.3 | 14 | 12 | 11 |
| 1,3,5-Trimethylbenzene | 2.0 | 46 | 41 | 41 |
| a-Methylstyrene | 1.3 | 72 | 62 | 49 |
| tert-Butylbenzene | 2.0 | ND | ND | ND |
| 1,2,4-Trimethylbenzene | 2.0 | 127 | 114 | 118 |
| sec-Butylbenzene | 3.3 | 3.1 | 2.4 | 2.6 |
| 4-Isopropylbenzene | 2.0 | 4.0 | 4.3 | 3.6 |
| n-Butylbenzene | 3.3 | ND | ND | ND |
| Alkanes | | 513 | 567 | 396 |
| Hexane | 2.0 | 18 | 12 | 13 |
| 2,2-Dimethlhexane | 1.3 | ND | ND | ND |
| Octane | 2.0 | 33 | 17 | 7.6 |
| Decane | 1.3 | 9.3 | 14 | 17 |
| Dodecane | 20 | 71 | 88 | 81 |
| Tetradecane | 40 | 381 | 436 | 277 |
| Alkenes | | 12 | 9.0 | 15 |
| 1-Hexene | 1.3 | ND | ND | ND |
| tr-2-Hexene | 1.3 | ND | ND | ND |
| 1-Octene | 1.3 | ND | ND | ND |
| Myrcene | 1.3 | ND | ND | ND |
| 1-Decene | 3.3 | ND | ND | ND |
| 1-Dodecene | 1.3 | 2.7 | 4.1 | 7.0 |
| 1-Tetradecene | 27 | 9.2 | 4.9 | 7.9 |
| Acetates | | 22 | 13 | 7.1 |
| Methyl acetate | 1.3 | ND | ND | ND |
| Vinyl acetate | 2.0 | 0.8 | 0.7 | 0.3 |
| Ethyl acetate | 2.0 | 3.7 | 2.5 | 1.6 |
| Isopropyl acetate | 2.0 | ND | ND | ND |
| Allyl acetate | 2.0 | 15 | 7.7 | 3.9 |
| n-Propyl acetate | 3.3 | 1.6 | 1.7 | 1.1 |
| Ethyl butyrate | 3.3 | ND | ND | ND |
| n-Butyl acetate | 1.3 | 0.8 | 0.2 | 0.1 |
| n-Pentyl acetate | 1.3 | ND | ND | ND |
| Isopentyl acetate | 6.7 | ND | ND | ND |
| Total Hydrocarbons | | 6496 | 4746 | 2279 |

ND = Not Detected
EQL = Estimated Quantitation Level

Table 7 shows an analysis of the volatiles released from the offset press test samples. We believe that the data of FIG. 3, based on Table 7 data, shows that the primary effect of the reactive chemistry is to substantially reduce the amount of volatile aldehydes. The alkanes and alkenes are substantially uneffected, while unsaturated aldehydes and aliphatic aldehydes are substantially removed.

The foregoing specification examples and data is a description of the invention as it is currently understood. The invention can have a variety of embodiments and aspects. Accordingly, the invention resides in the claims hereinafter appended.

We claim:

1. A fountain solution used in defining an image on a printing plate, the fountain solution comprising a source of a volatile carbonyl compound and:

(a) a major proportion of an aqueous medium;

(b) a water soluble polymer in an amount from about 0.01 to about 1 wt% of the solution;

(c) a pH modifying substance to maintain the pH tinge from about 2 to about 7;

(d) an effective amount of a surfactant to spread the fountain solution uniformly on a printing plate; and (e) a reactive composition capable of reacting with the volatile organic carbonyl compound in the fountain solution to substantially reduce the release of the carbonyl compound from the fountain solution.

2. The solution of claim 1 wherein the water soluble polymer is a natural product polymer is present in an amount from about 0.05 to about 0.5 wt % of the solution.

3. The solution of claim 1 comprising about 1 to 40 wt % of the reactive composition.

4. The solution of claim 3 wherein the reactive composition comprises a hydrazide compound.

5. The solution of claim 4 wherein the hydrazide compound comprises an aromatic hydrazide.

6. The solution of claim 5 wherein the aromatic hydrazide comprises benzoic hydrazide.

7. The solution of claim 1 wherein the reactive composition comprises urea.

8. The solution of claim 1 wherein the reactive composition comprises a guanidine sulfate.

9. The solution of claim 1 wherein the reactive composition comprises an alkali metal bisulfite.

10. The solution of claim 1 wherein the volatile organic carbonyl compound comprises a $C_{5-9}$ aldehyde or mixture thereof.

11. The fountain solution of claim 1 wherein the polymeric substance comprises a natural gum.

12. The fountain solution of claim 11 wherein the natural gum comprises gum arabic.

13. A overcoat solution used as a finish coating in a printed structure, the solution comprising:

(a) a major proportion of an aqueous medium;

(b) a water soluble polymer in an amount from about 10 to about 80 wt % of the solution; and (c) a reactive composition capable of reacting with the volatile organic carbonyl compound in the fountain solution to substantially reduce the release of the carbonyl compound from the fountain solution, ink, paperboard, claycoat or overcoat.

14. The solution of claim 13 wherein the water soluble polymer is present in an amount from about 10 to about 80 wt % of the solution.

15. The solution of claim 13 comprising about 0.01 to 3.0 wt % of the reactive composition.

16. The solution of claim 15 wherein the reactive composition comprises a hydrazide compound.

17. The solution of claim 16 wherein the hydrazide compound comprises an aromatic hydrazide.

18. The solution of claim 17 wherein the aromatic hydrazide comprises benzoic hydrazide.

19. The solution of claim 13 wherein the reactive composition comprises urea.

20. The solution of claim 13 wherein the reactive composition comprises a mixture of urea and an aromatic hydrazide.

21. The solution of claim 13 wherein tho reactive composition comprises an alkali metal bisulfite.

22. The solution of claim 13 wherein the volatile organic carbonyl compound comprises a $C_{5-9}$ aldehyde or mixtures thereof.

23. The solution of claim 13 wherein the polymeric substance comprises an acrylic copolymer.

* * * * *